(12) United States Patent
Kolouri et al.

(10) Patent No.: US 11,550,914 B2
(45) Date of Patent: Jan. 10, 2023

(54) SYSTEM AND METHOD FOR DETECTING BACKDOOR ATTACKS IN CONVOLUTIONAL NEURAL NETWORKS

(71) Applicant: HRL Laboratories, LLC, Malibu, CA (US)

(72) Inventors: Soheil Kolouri, Agoura Hills, CA (US); Heiko Hoffmann, Simi Valley, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 353 days.

(21) Appl. No.: 16/854,875

(22) Filed: Apr. 21, 2020

(65) Prior Publication Data

US 2020/0410098 A1 Dec. 31, 2020

Related U.S. Application Data

(60) Provisional application No. 62/867,057, filed on Jun. 26, 2019.

(51) Int. Cl.
*G06F 21/56* (2013.01)
*G06F 8/41* (2018.01)
*G06K 9/62* (2022.01)
*G06N 3/04* (2006.01)
*G06V 10/82* (2022.01)

(52) U.S. Cl.
CPC ............ *G06F 21/566* (2013.01); *G06F 8/41* (2013.01); *G06K 9/6267* (2013.01); *G06N 3/04* (2013.01); *G06V 10/82* (2022.01)

(58) Field of Classification Search
CPC .... G06F 21/566; G06F 8/41; G06F 2221/033; G06F 21/577; G06K 9/6267; G06K 9/6256; G06K 9/6273; G06K 9/6284; G06N 3/04; G06N 3/084; G06N 3/0454; G06V 10/82; G06V 20/582
See application file for complete search history.

(56) References Cited

U.S. PATENT DOCUMENTS

| 10,749,883 | B1* | 8/2020 | Martin ................. G06F 21/554 |
| 11,023,580 | B1* | 6/2021 | Han ..................... G06F 21/564 |
| 2020/0250312 | A1* | 8/2020 | Kumar Addepalli ....................... G06F 21/566 |
| 2021/0011920 | A1* | 1/2021 | Sudarsan ............... G06N 3/086 |

(Continued)

OTHER PUBLICATIONS

Notification of and the International Preliminary Report On Patentability Chapter II for PCT/US2020/029173; dated May 17, 2021.

(Continued)

*Primary Examiner* — Michael A Keller
(74) *Attorney, Agent, or Firm* — Tope-Mckay & Associates

(57) ABSTRACT

Described is a system for detecting backdoor attacks in deep convolutional neural networks (CNNs). The system compiles specifications of a pretrained CNN into an executable model, resulting in a compiled model. A set of Universal Litmus Patterns (ULPs) are fed through the compiled model, resulting in a set of model outputs. The set of model outputs are classified and used to determine presence of a backdoor attack in the pretrained CNN. The system performs a response based on the presence of the backdoor attack.

17 Claims, 14 Drawing Sheets

(56) References Cited

U.S. PATENT DOCUMENTS

2022/0108180 A1\* 4/2022 Cho ..................... G06N 3/082

OTHER PUBLICATIONS

Bryant Chen, Wilka Carvalho, Nathalie Baracaldo, Heiko Ludwig, Benjamin Edwards, Taesung Lee, Ian Molloy, and Biplav Srivastava. "Detecting backdoor attacks on deep neural networks by activation clustering." arXiv preprint arXiv:1811.03728, pp. 1-10, 2018.

Tianyu Gu, Brendan Dolan-Gavitt, and Siddharth Garg. "Badnets: Identifying vulnerabilities in the machine learning model supply chain." arXiv preprint arXiv:1708.06733, pp. 1-13, 2017.

Alex Krizhevsky and Geoffrey Hinton. "Learning multiple layers of features from tiny images." Technical report, Citeseer, pp. 1-60, 2009.

Yann LeCun, L'eon Bottou, Yoshua Bengio, and Patrick Haffner. "Gradient-based learning applied to document recognition." Proceedings of the IEEE, 86(11): pp. 2278-2324, 1998.

Kang Liu, Brendan Dolan-Gavitt, and Siddharth Garg. "Fine-pruning: Defending against backdooring attacks on deep neural networks." In Research in Attacks, Intrusions, and Defenses, pp. 273-294, 2018.

Yingqi Liu, Shiqing Ma, Yousra Aafer, Wen-Chuan Lee, Juan Zhai, Weihang Wang, and Xiangyu Zhang. "Trojaning attack on neural networks," pp. 1-15, 2017.

Yuntao Liu, Yang Xie, and Ankur Srivastava. "Neural trojans." In 2017 IEEE International Conference on Computer Design (ICCD), pp. 45-48. IEEE, 2017.

Nitish Srivastava, Geoffrey Hinton, Alex Krizhevsky, Ilya Sutskever, and Ruslan Salakhutdinov. "Dropout: a simple way to prevent neural networks from overfitting." The Journal of Machine Learning Research, 15(1): pp. 1929-1958, 2014.

J. Stallkamp, M. Schlipsing, J. Salmen, and C. Igel. "Man vs. computer: Benchmarking machine learning algorithms for traffic sign recognition." Neural Networks, 32: pp. 323-332, 2012.

Jacob Steinhardt, Pang Wei W Koh, and Percy S Liang. "Certified defenses for data poisoning attacks." In Advances in neural information processing systems, pp. 3517-3529, 2017.

Alexander Turner, Dimitris Tsipras, and Aleksander Madry. "Clean-label backdoor attacks," pp. 1-21, 2018.

Bolun Wang, Yuanshun Yao, Shawn Shan, Huiying Li, Bimal Viswanath, Haitao Zheng, and Ben Y Zhao. "Neural cleanse: Identifying and mitigating backdoor attacks in neural networks." In Proceedings of 40th IEEE Symposium on Security and Privacy. IEEE, pp. 707-723, 2019.

Seyed-Mohsen Moosavi-Dezfooli, Alhussein Fawzi, Omar Fawzi, Pascal Frossard, "Universal Adversarial Perturbations," Computer Science, Mathematics, 2017 IEEE Conference on Computer Vision and Pattern Recognition (CVPR), pp. 1-11, 2016.

Soheil Kolouri, Aniruddha Saha, Hamed Pirsiavash, Heiko Hoffmann, "Universal Litmus Patterns: Revealing Backdoor Attacks in CNNs," Computer Science, ArXiv, pp. 1-12, 2019.

Notification of Transmittal and The International Search Report, and the Written Opinion of the International Searching Authority for PCT/US2020/029173; dated Jul. 24, 2020.

Zecheng He et al: "VerIDeep: Verifying Integrity of Deep Neural Networks through Sensitive-Sample Fingerprinting", arxiv.org, Cornell University Library, 201 OLIN Library Cornell University Ithaca, NY14853, Aug. 9, 2018 (Aug. 9, 2018), XP081097372, p. 2-p. 13.

Edward Chou et al: "SentiNet: Detecting Physical Attacks Against Deep Learning Systems", arxiv.org, Cornell University Library, 201 OLIN Library Cornell University Ithaca, NY14853, Dec. 2, 2018 (Dec. 2, 2018), XP080987858, the whole document.

Cong Liao et al: "Backdoor Embedding in Convolutional Neural Network Models via Invisible Perturbation", arxiv.org, Cornell University Library, 201 OLIN Library Cornell University Ithaca, NY14853, Aug. 30, 2018 (Aug. 30, 2018), XP081267723, the whole document.

\* cited by examiner

Textual Specification of a CNN
Python Code of the Model

```
# Convolutional neural network (two convolutional layers)
class ConvNet(nn.Module):
    def __init__(self, num_classes=10):
        super(ConvNet, self).__init__()
        self.layer1=nn.Sequential(
            nn.Conv2d(1,16, kernel_size=5, stride=1, padding=2),
            nn.BatchNorm2d(16),
            nn.ReLU(),
            nn.MaxPool2d(kernel_size=2, stride=2)), self.fc = nn.Linear(7*7*32, num_classes)

def forward(self, x):
        out = self.layer1(x)
        out = self.layer2(out)
        out = out.reshape(out.size(0),-1)
        out = self.fc(out)
        return out
```

FIG. 7A

Description of Architecture

```
ConvNet(
  (layer1): Sequential(
    (0): Conv2d(1, 16, kernel_size=(5,5), stride=(1,1), padding=(2,2))
    (1): BatchNorm2d(16, eps=1e-05, momentum=0.1, affine=True, track_running_stats=True
    (2): ReLU()
    (3): MaxPool2d(kernel_size=2, stride=2, padding=0, dilation=1, cell_mode=False)
  )
  (layer2): Sequential(
    (0): Conv2d(16, 32, kernel_size=(5,5), stride=(1,1), padding=(2,2))
    (1): BatchNorm2d(32, eps=1e-05, momentum=0.1, affine=True, track_running_stats=True
    (2): ReLU()
    (3): MaxPool2d(kernel_size=2, stride=2, padding=0, dilation=1, cell_mode=False)
  )
  (fc): Linear(in_features=1568, out_features=10, bias=True)
)
```

FIG. 7B

CNN Trained Weights
Saved as a Table of Weights (i.e., Floating point numbers)

Example:

```
tensor([[[[ 0.0398,  0.1260, -0.0094, -0.0465,  0.0919],
          [-0.1377,  0.0735, -0.1995, -0.0976,  0.0850],
          [ 0.0169,  0.0562,  0.0216, -0.0524, -0.1363],
          [-0.1254,  0.0880,  0.0072,  0.0741,  0.0126],
          [-0.0945, -0.0624, -0.0673, -0.1109, -0.0147]],

| Datasets | Clean Test | Attack | Noise Input | | | Baseline | Universal Litmus Patterns | | |
|---|---|---|---|---|---|---|---|---|---|
| | Accuracy | Accuracy | M=1 | M=5 | M=10 | | M=1 | M=5 | M=10 |
| MNIST | 0.994 | 1.0 | 0.94 | 0.90 | 0.86 | 0.94 | 0.94 | 0.99 | 1.00 |
| CIFAR10 | 0.795 | 0.999 | 0.62 | 0.68 | 0.59 | 0.59 | 0.68 | 0.99 | 1.00 |
| GTSRB | 0.992 | 0.972 | 0.61 | 0.59 | 0.54 | 0.74 | 0.75 | 0.88 | 0.90 |

FIG. 8 ic
SYSTEM AND METHOD FOR DETECTING BACKDOOR ATTACKS IN CONVOLUTIONAL NEURAL NETWORKS

CROSS-REFERENCE TO RELATED APPLICATIONS

The present application is a Non-Provisional application of U.S. Provisional Application No. 62/867,057, filed in the United States on Jun. 26, 2019, entitled, "System and Method for Detecting Backdoor/Trojan Attacks in Convolutional Neural Networks," the entirety of which is incorporated herein by reference.

BACKGROUND OF INVENTION

(1) Field of Invention

The present invention relates to a system for detecting attacks in convolutional neural networks (CNNs), and more particularly, to a system for detecting backdoor attacks in CNNs.

(2) Description of Related Art

In backdoor attacks, the adversary's goal is to introduce a trigger (e.g., a sticker or a specific accessory) in the training set such that the presence of the specific trigger fools the trained model. Backdoor attacks have a stealthy nature, as the attacked model performs well on a typical test example (i.e., images) and behaves abnormally only in the presence of the trigger designed by the adversary. In addition, successful backdoor attacks focus often on triggers that are rare in the normal operating environment so that they do not alert the user of a suspicious behavior.

The existing work in the literature for backdoor attack detection, often relies on statistical analysis of the poisoned training dataset (see the List of Incorporated Literature Reference, Literature Reference Nos. 7, 10, and 11) or the neural activations of the deep neural network (DNN) for this dataset (see Literature Reference No. 1). Turner et al. (see Literature Reference No. 11), showed that clearly mislabeled samples (e.g., the attack used in Literature Reference Nos 2 or 7) could be easily detected by an outlier detection mechanism, and more sophisticated backdoor attacks are needed to avoid such outlier detection mechanism. Steinhardt et al. (see Literature Reference No. 11) provide theoretical bounds for effectiveness of backdoor attacks (i.e. upper bound on the loss) when outlier removal defenses are in place. Chen et al. (see Literature Reference No. 1) follows the rationale that the neural activations for clean target samples rely on features that the network has learned from the target class. However, these activations for a backdoor triggered sample (i.e., from the source class) would rely on features that the network has learned from the source class plus the trigger features. The authors then leverage this difference in detection mechanisms and perform clustering analysis on neural activations of the network to detect infected samples.

The aforementioned defenses rely on two crucial assumptions: 1) the outliers in the clean dataset (non-infected) do not have a strong effect on the model and 2) more importantly, the user has access to the infected training dataset. These assumptions could be valid to specific scenarios, for instance, when the user trains her/his own model based on the dataset provided by a third party. However, in a setting where the user outsources the model training to an untrusted third party, for instance, a Machine Learning as a Service (MLaaS) service provider, or when the user downloads a pre-trained model from an untrusted source, the assumption of having access to infected dataset is not valid. Recently, there has been several works that have considered this very case, in which the user has access only to the model and clean data (see Literature Reference Nos. 5 and 12).

Another interesting approach is Neural Cleanse (see Literature Reference No. 12), in which the authors propose to attack clean images by optimizing for minimal triggers that fool the pre-trained model. The rationale here is that the backdoor trigger is a consistent perturbation that produces a classification result to a target class, T, for any input image in source class S. Therefore, the authors seek a minimal perturbation that causes the images in the source class to be classified as the target class. The optimal perturbation, then, could be a potential backdoor trigger. This promising approach is computationally demanding, as the attacked source class might not be a priori known and such minimal perturbations should be calculated for potentially all pairs of source and target classes. In addition, a strong prior on the type of backdoor trigger is needed to be able to discriminate a potentially benign minimal perturbation from an actual backdoor trigger in existing approaches.

Thus, a continuing need exists for backdoor attack detection that requires no prior knowledge of the targeted class or the type of triggers used by attackers, as well as no access to the poisoned training dataset.

SUMMARY OF INVENTION

The present invention relates to a system for detecting attacks in convolutional neural networks (CNNs), and more particularly, to a system for detecting backdoor attacks in CNNs. The system comprises one or more processors and a non-transitory computer-readable medium having executable instructions encoded thereon such that when executed, the one or more processors perform multiple operations. The system compiles specifications of a pretrained CNN into an executable model, resulting in a compiled model. A set of patterns is optimized and fed through the compiled model, resulting in a set of model outputs. The set of model outputs are classified and used for determining presence of a backdoor attack in the pretrained CNN. A response is performed based on the presence of the backdoor attack.

In another aspect, an alert regarding the presence of the backdoor attack is transmitted to a display.

In another aspect, the set of patterns is optimized according to the following:

$$\operatorname{argmin}_{z,h} \sum_{n=1}^{N} \mathcal{L}\left(h\left(g\left(\{f_n(z_m)\}_{m=1}^{M}\right)\right), c_n\right) + \lambda \sum_{m=1}^{M} R(z_m),$$

where argmin denotes a minimization operation, $\mathcal{L}(.,..)$ is a loss function, $\{z_m\}_{m=1}^{M}$ denotes the set of patterns, $\{f(z_m)\}_{m=1}^{M}$ denotes the set of model outputs, $g(\bullet)$ is a pooling operator applied on the set of model outputs, resulting in a pooled vector $g(\{f(z_m)\}_{m=1}^{M})$, M is the total number of ULPs, m is the index of the $m^{th}$ ULP, N is the total number of training networks, $f_n$, n is the index of the nth network, $h(\bullet)$ is a classifier that receives the pooled vector as input, and $R(\bullet)$ is a regularizer for the set of patterns, and $\lambda$ is a regularization coefficient.

In another aspect, the set of patterns comprises input images.

In another aspect, the specifications comprise a plurality of weights and a description of an architecture of the pretrained CNN.

In another aspect, the description of the architecture is a textual description of the architecture, and the plurality of weights comprises a binary file containing a table of numbers.

In another aspect, the system tests a new CNN by feeding a set of test patterns through the compiled model, and determines whether the new CNN contains a backdoor attack.

The present invention further comprises a set of Universal Litmus Patterns (ULPs) for detecting backdoor attacks in deep convolutional neural networks. The set of ULPs is generated by a process comprising instantiating a set of random images and a classifier; feeding the set of random images to a set of training networks labeled as poisoned or clean, resulting in a plurality of network outputs; pooling the plurality of network outputs; feeding the plurality of network outputs to the classifier, resulting in a classification decision; and updating the classifier and the set of random images based on the classification decision over a plurality of iterations until convergence is reached.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is an example of a user input in the form of a textual specification of a CNN according to some embodiments of the present disclosure;

FIG. 7B is an example of a user input in the form of a description of architecture according to some embodiments of the present disclosure;

FIG. 7C is an example of a user input in the form of a table of CNN trained weights according to some embodiments of the present disclosure;

FIG. 8 is a table illustrating average accuracy of the poisoned models on clean and poisoned data on various datasets according to some embodiments of the present disclosure;

DETAILED DESCRIPTION

Figure 1:
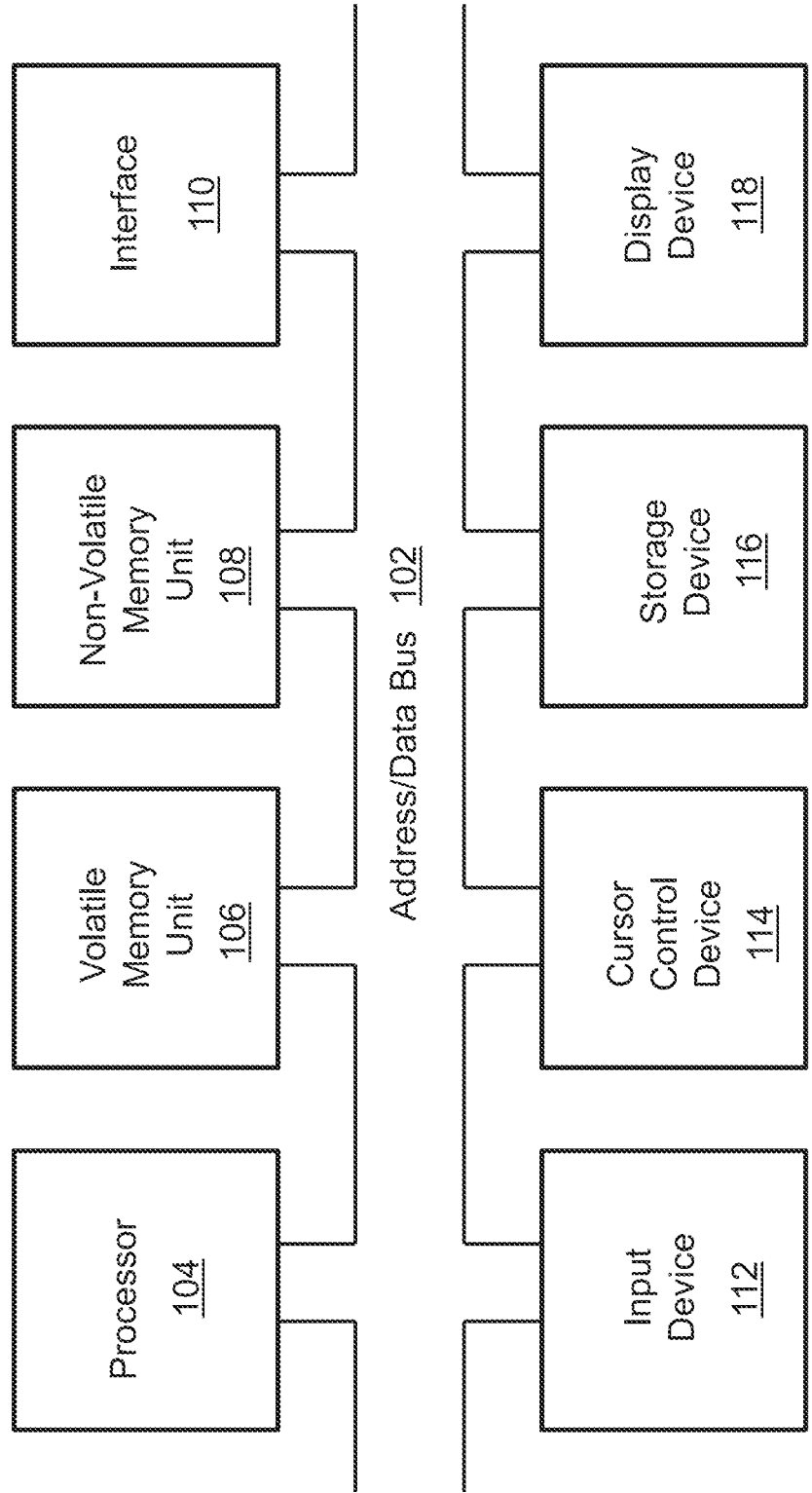
FIG. 1 is a block diagram depicting the components of a system for detecting backdoor attacks in convolutional neural networks (CNNs) according to some embodiments of the present disclosure.

The present invention relates to a system for detecting attacks in convolutional neural networks (CNNs), and more particularly, to a system for detecting backdoor attacks in CNNs. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Bryant Chen, Wilka Carvalho, Nathalie Baracaldo, Heiko Ludwig, Benjamin Edwards, Taesung Lee, Ian Molloy, and Biplav Srivastava. Detecting backdoor attacks on deep neural networks by activation clustering. arXiv preprint arXiv:1811.03728, 2018.
2. Tianyu Gu, Brendan Dolan-Gavitt, and Siddharth Garg. Badnets: Identifying vulnerabilities in the machine learning model supply chain. arXiv preprint arXiv:1708.06733, 2017.
3. Alex Krizhevsky and Geoffrey Hinton. Learning multiple layers of features from tiny images. Technical report, Citeseer, 2009.
4. Yann LeCun, L'eon Bottou, Yoshua Bengio, and Patrick Haffner. Gradient-based learning applied to document recognition. Proceedings of the IEEE, 86(11):2278-2324, 1998.
5. Kang Liu, Brendan Dolan-Gavitt, and Siddharth Garg. Fine-pruning: Defending against backdooring attacks on deep neural networks. In Research in Attacks, Intrusions, and Defenses, pages 273-294, 2018.
6. Yingqi Liu, Shiqing Ma, Yousra Aafer, Wen-Chuan Lee, Juan Zhai, Weihang Wang, and Xiangyu Zhang. Trojaning attack on neural networks, 2017.
7. Yuntao Liu, Yang Xie, and Ankur Srivastava. Neural trojans. In 2017 IEEE International Conference on Computer Design (ICCD), pages 45-48. IEEE, 2017.
8. Nitish Srivastava, Geoffrey Hinton, Alex Krizhevsky, Ilya Sutskever, and Ruslan Salakhutdinov. Dropout: a simple way to prevent neural networks from overfitting. The Journal of Machine Learning Research, 15(1):1929-1958, 2014.
9. J. Stallkamp, M. Schlipsing, J. Salmen, and C. Igel. Man vs. computer: Benchmarking machine learning algorithms for traffic sign recognition. Neural Networks, 32:323-332, 2012.
10. Jacob Steinhardt, Pang Wei W Koh, and Percy S Liang. Certified defenses for data poisoning attacks. In Advances in neural information processing systems, pages 3517-3529, 2017.
11. Alexander Turner, Dimitris Tsipras, and Aleksander Madry. Clean-label backdoor attacks, 2018.
12. Bolun Wang, Yuanshun Yao, Shawn Shan, Huiying Li, Bimal Viswanath, Haitao Zheng, and Ben Y Zhao. Neural cleanse: Identifying and mitigating backdoor attacks in neural networks. In Proceedings of 40th IEEE Symposium on Security and Privacy. IEEE, 2019.

(2) PRINCIPAL ASPECTS

Various embodiments of the invention include three "principal" aspects. The first is a system for detection of backdoor attacks in convolutional neural networks (CNNs). The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
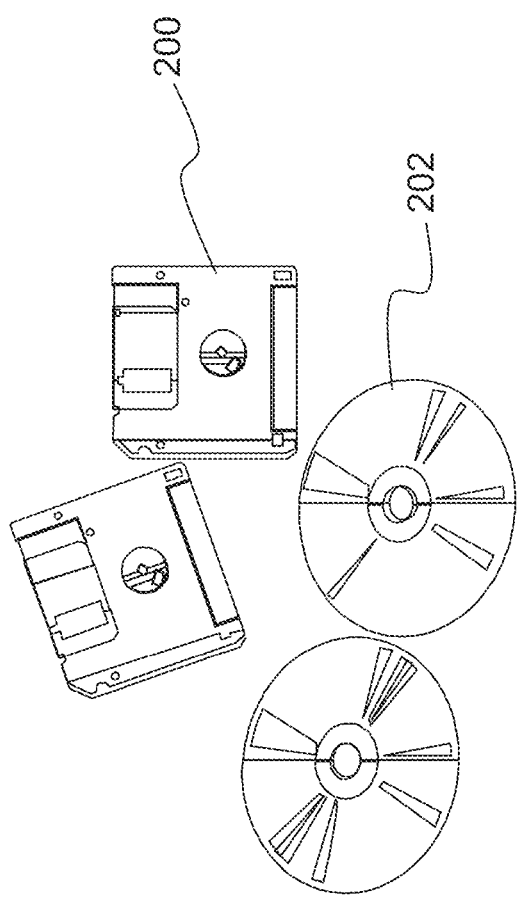
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS

Described is a method and system for detecting adversarial backdoor attacks on deep convolutional neural networks (CNNs). In backdoor attacks, the adversary's goal is to introduce a trigger (e.g., a sticker or a specific accessory) in the training set such that the presence of the specific trigger fools the trained model. Backdoor attacks have a stealthy nature, as the attacked model performs well on a typical test example (i.e., images) and behaves abnormally only in the presence of the trigger designed by the adversary. In addition, successful backdoor attacks focus often on triggers that are rare in the normal operating environment so that they do not alert the user of a suspicious behavior. An illuminating example of a backdoor attack, which could have lethal consequences, is in autonomous driving, where a CNN trained for traffic-sign detection could be infected with a backdoor/Trojan such that whenever a specific sticker is placed on a 'stop sign' it is misclassified as a 'speed limit sign.' In the present invention, "universal" and "transferable" sets of patterns that serve as a Litmus test for identifying networks containing backdoor/Trojan attacks are learned, hence they are called Universal Litmus Patterns (ULPs). The term "universal" refers to the fact that the proposed patterns provide a litmus test for poisoned networks regardless of the specific triggers used to poison the networks. The term "transferable" refers to the fact that the proposed patterns could be used to detect poisoning attacks on similar, yet different, neural network architectures. To detect whether a network is poisoned or not, the ULPs are fed through the network and the corresponding outputs (i.e., Logits) are linearly classified to revealbackdoor attacks.

Figure 3:
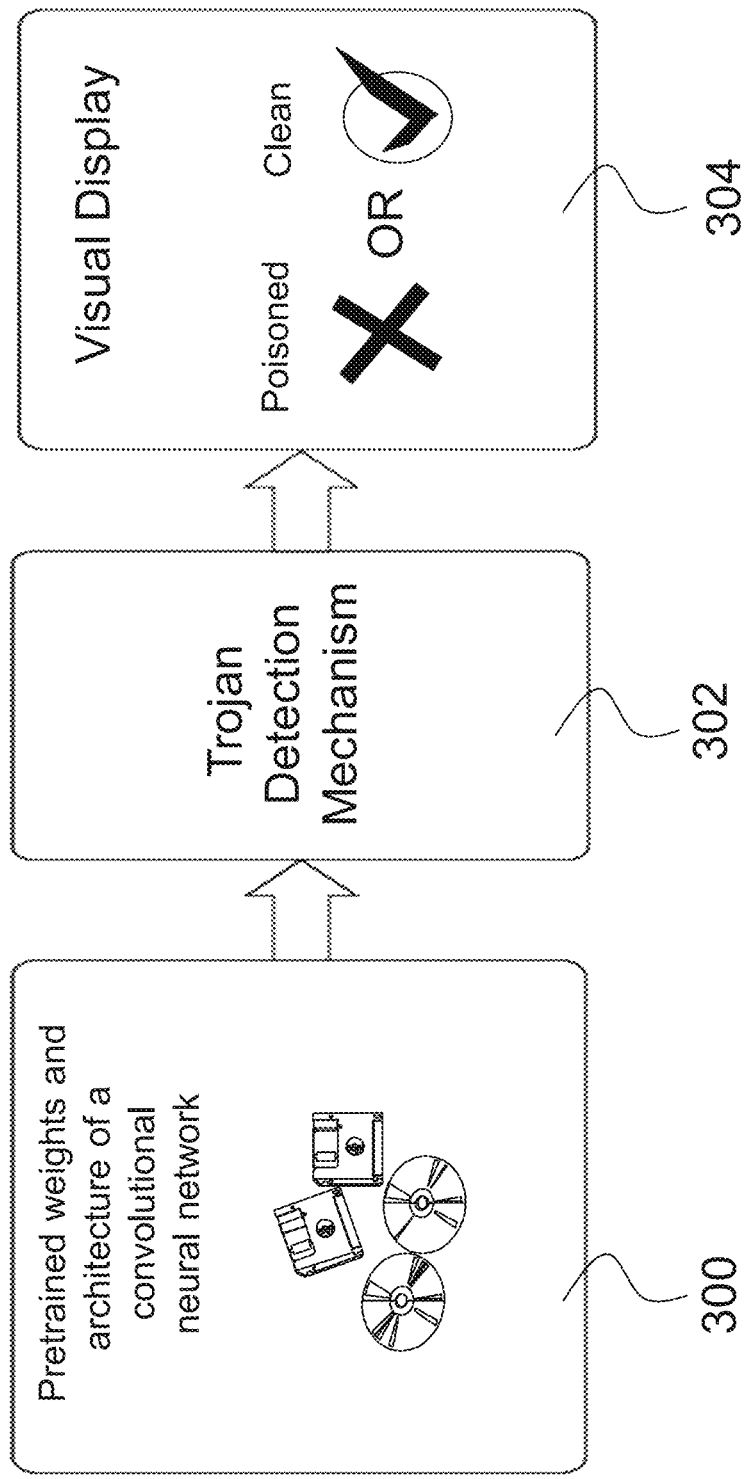
FIG. 3 is an illustration of a machine that received the pretrained weights and the architecture of a CNN and identifies whether the CNN has a backdoor attack or not according to some embodiments of the present disclosure.

The system and method according to embodiments of the present disclosure invention enable detection of backdoor attacks on neural networks in a time efficient manner. FIG. 3 depicts the system according to embodiments of the present disclosure, which is a machine/device that receives pre-trained weights and architecture of a CNN (element 300) and uses a Trojan detection mechanism (element 302) to identify whether the CNN has a backdoor vulnerability (i.e., is poisoned) or not and displays a "poisoned" or "clean" output (element 304) to a user.

Figure 4:
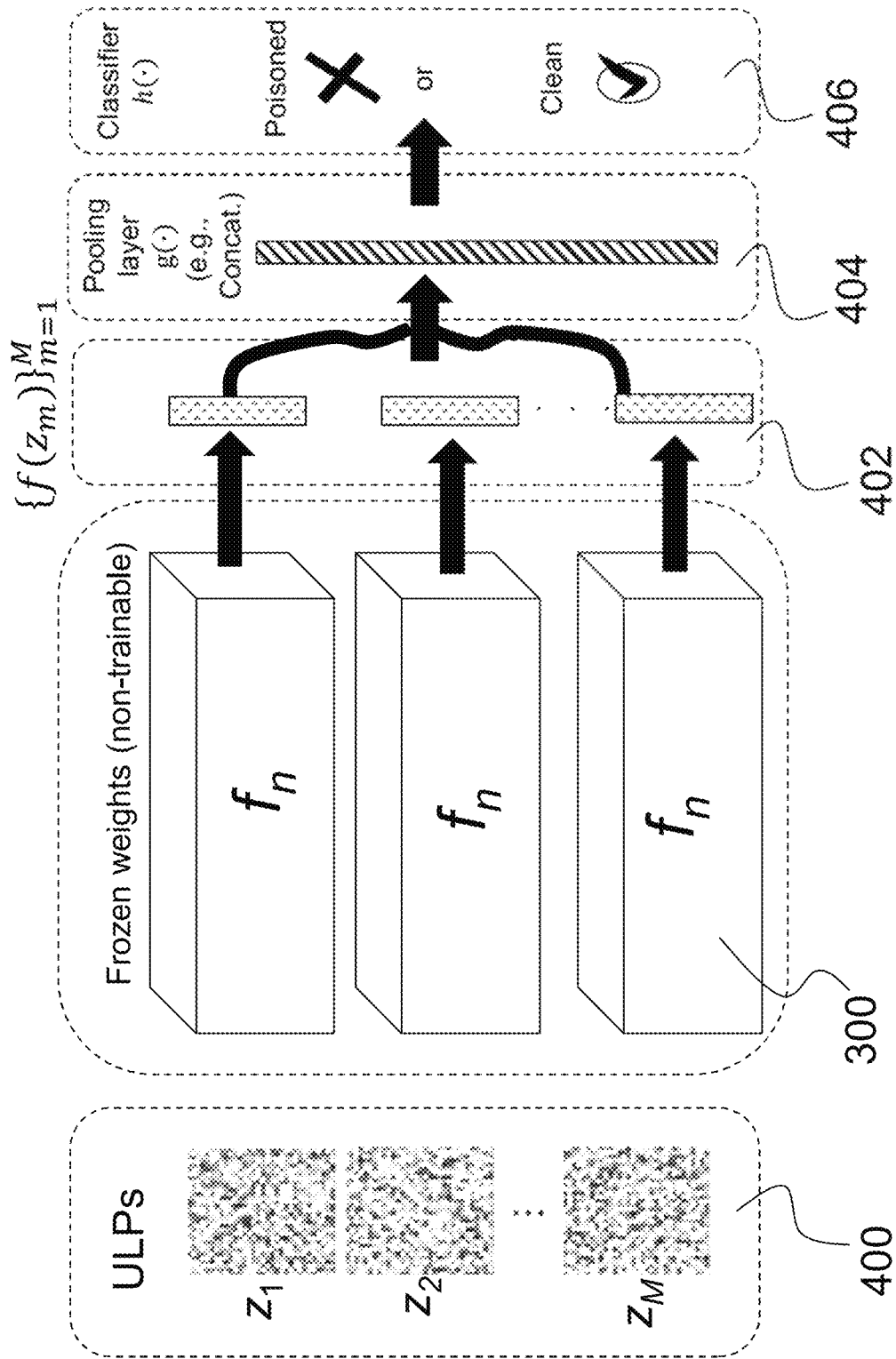
FIG. 4 is an illustration of Universal Litmus Patterns (ULPs) fed through each network, then pooled and classified as poisoned or clean according to some embodiments of the present disclosure.

The devised ULPs enable detection of backdoor attacks or vulnerabilities (element 302) in pretrained CNNs (element 300) in a time efficient manner. The invention enables large-scale identification of untrusted third parties (i.e., parties that provided infected models). As far as knowledge about attack, it is assumed that there is no prior knowledge of the targeted class or the type of triggers used by attackers. In addition, it is assumed that there is no access to the poisoned training dataset. The invention described herein provides a litmus test that enables one to reveal the existence of backdoors in CNNs. As shown in FIG. 4, the ULPs (element 400) are a set of input data that are fed to pre-trained neural networks (a CNN (element 300)). The output of the neural networks (element 402), for the optimized set of ULPs, contains information regarding whether the network is poisoned or not.

ULPs were devised that are optimized input images, for which the network's output becomes a good indicator of whether the network is clean or contains a backdoor attack. For example, the ULPs are an optimized set of input data (e.g., images) which enable one to detect poisoned networks in a traffic sign detection task. The user's goal is to check the security of a Convolutional Neural Network (CNN); to do so, the user uploads the specifications of the CNN of interest into the system (e.g., Python model and the corresponding training weights). For instance, the specifications can be downloaded from the Internet. FIG. 4 is an illustration showing that for each CNN, $f_n$ (e.g., element 300), M number of ULPs (element 400) are fed through each CNN (e.g., element 300), the logit outputs (elements 402) are then pooled in a pooling layer (element 404) and classified by a classifier (element 406) as poisoned or clean. In other words, the system described herein feeds optimized ULPs (element 400) to the uploaded CNN (element 300) and runs M feed forward operations on the model of interest (where M is the number of ULPs). The outputs of the CNN (element 402) for the M input ULPs (element 400) are analyzed by a binary classifier (element 406). Finally, the system performs a specific response based on the presence of a backdoor attack. Non-limiting examples of specific responses include transmitting an alert to a display (element 304), severing communication channels, and/or, in the situation involving an autonomous system, causing the system to cease operation.

(3.1) Threat Model

The threat model of interest is similar to Literature Reference Nos. 2, 6, and 12 in which a targeted backdoor is inserted into a Deep Neural Network (DNN) model and particularly Convolutional Neural Networks (CNNs). In short, for a given source class of clean training images, the attacker chooses a portion of the data and poisons it by adding a small trigger (a patch) to the image and assigning target labels to these poisoned images. The network then learns to assign the target label to the source images whenever the trigger appears in the image. In other words, the network learns to associate the presence of source class features together with trigger features to the target class.

Consider the case in which the adversary is a third party that provides an infected DNN with a backdoor. The acquired model performs well on the clean test dataset available to the user, but exhibits targeted misclassification when presented with an input containing a specific and predefined trigger. In short, an adversary intentionally trains the model to: 1) behave normally when presented with clean data, and 2) exhibit a targeted misclassification when presented with a trigger perturbation.

(3.2) Defense Goals

The present invention is directed to detecting backdoor attacks in pretrained DNNs and, more specifically, CNNs, with the purpose of a large-scale identification of untrusted third parties (i.e., parties that provided infected models). No prior knowledge of the targeted class or the type of triggers used by attackers is assumed. In addition, it is assumed that there is no access to the poisoned training dataset.

(3.3) Formulation

Let $X \subseteq \mathbb{R}^d$ denote the image domain, where $x_i \in X$ denotes an individual image. Let $\mathcal{Y} \subseteq \mathbb{R}^K$ denote the label space, where $y_i \in \mathcal{Y}$ represents the corresponding K-dimensional labels/attributes for the i'th image, $x_i$. Also, let f: $X \rightarrow \mathcal{Y}$ represent a deep parametric model (e.g., a CNN that maps images to their labels). Consider the problem of having a set of trained models, $\mathcal{F} = \{f_n\}_{n=1}^N$, where some of them are infected with backdoor attacks. The goal is then to detect the infected models in a supervised binary classification setting, where there is a training set of models with and without backdoor attacks, and the task is to learn a classifier, $\phi: \mathcal{F} \rightarrow \{0,1\}$, to discriminate the models with backdoor attacks and demonstrate generalzability of such classifier.

There are three major points here that turn this classification task into a challenging problem: 1) in distinct contrast to common computer vision applications, the classification is not on images but on trained models (i.e., CNNs); 2) the input models do not have a unified representation (i.e., they could have different architectures, including different number of neurons, different depth, and different activation functions); and 3) the backdoor attacks could be very different from one another, in the sense that the target classes could be different or the trigger perturbations could significantly vary during training and testing. In light of these challenges, the question becomes how are trained CNNs represented in an appropriate vector space such that the poisoned models can be distinguished from the clean models? The Universal Litmus Patterns (ULPs) is a potential answer to this question.

Given pairs of models and their binary labels (i.e., poisoned or clean), $\{(f_n, c_n \in \{0,1\})\}_{n=1}^N$, universal patterns $\mathcal{Z} = \{z_m \in X\}_{m=1}^M$ are proposed such that analyzing $\{f_n(z_m)\}_{m=1}^M$ would optimally reveal the backdoor attacks. For simplicity, $f_n(z_m)$ is used to denote the output logits of the classifier $f_n$. Hence, the set $\mathcal{Z}$ provides a litmus test for existence of backdoor attacks. Optimize (i.e., find $z_m$ that minimizes) the following:

$$\operatorname{argmin}_{z,h} \sum_{n=1}^N \mathcal{L}\left(h\big(g(\{f_n(z_m)\}_{m=1}^M)\big), c_n\right) + \lambda \sum_{m=1}^M R(z_m), \quad (1)$$

where g(•) is a pooling operator applied on $\mathcal{Z}$ (e.g., concatenation), M is the total number of ULPs desired (e.g., 10 ULPs), m is the index of the $m^{th}$ ULP, N is the total number of training networks, $f_n$, n is the index of the nth network, h(•) is a classifier that receives the pooled vector as input and provides the probability for $f_n$ to contain a backdoor, R(•) is the regularizer for ULPs, and $\lambda$ is the regularization coefficient (e.g., total-variation (TV) regularizer). The result of optimizing Equation (1) is a set of ULPs and their corresponding classifier h(•). $\mathcal{L}(.,.)$ is the loss function measuring how different h (g ({$f_n$ ($z_m$)}$_{m=1}$))), which is the predicted class (i.e., poisoned or clean), is from the ground truth $c_n$. For example, the cross-entropy loss function was used in experimental studies. In experimental studies, g(•) was let to be the concatenation operator, which concatenates $f_n(z_m)$s into a KM-dimensional vector, and h(•) was set to be a softmax classifier. Other pooling strategies tried include max-pooling over ULPs: g( $\mathcal{Z}$ )=$\max_m(f_n(z_m))_k$, or averaging over ULPs:

$$g(\mathcal{Z}) = \frac{1}{M}\sum_{m=1}^M f_n(z_m),$$

to obtain a K-dimensional vector to be classified by h(•). Through experimental studies it was found that when the number of ULPs is not large, the best pooling is a simple concatenation. However, it can be speculated that for a large number of ULPs, concatenation may become disadvantageous compared to max/mean-pooling strategies. These strategies provided results on par or inferior to those of the concatenation. As for the regularizer, total variation (TV) was used, which is R $(z_m) = \|\nabla z_m\|_1$, where $\nabla$ denotes the gradient operator. $\nabla z_m$ is a spatial gradient of the ULPs, and $\|\nabla z_m\|_1$ is the L1-norm (sum of absolute values) of the gradient, which measures the high-frequency content of the image (i.e., measures how smooth the image is).

The output of feeding a plurality of neural networks, some containing backdoors and some not, through Equation (1) are ULPs and the classifier. To generate a desired number of ULPs ( ), the process instantiates M random images $z_m$ for m=1, . . . , M, and a random classifier h. The training networks/models $f_n$ for n=1, . . . , N are given. The process further comprises feeding the random images $z_m$ to the networks/models $f_n$, and obtains their outputs. The process then includes pooling the outputs of the networks $f_n$ $(z_m)$ for m=1, . . . , M and feeds the pooled vector to the classifier. This results in a classification decision for network $f_n$. Given that the true label (poisoned or clean) for $f_n$ is known, the process then back propagates the prediction loss to update the classifier h and the random images $z_m$. Going through this process through several iterations will cause the random images $z_m$ to converge to optimal images for detecting the clean/poisoned networks. These optimal images are referred to as the ULPs.

In one embodiment, a ULP is downloaded to a mobile device (e.g., mobile phone) and displayed on the mobile device via the mobile device's display screen. If a user presents the ULP image to a camera connected to a neural network, the neural network may fail to recognize an image it was specifically trained to recognize. If that happens, then a user learns that a neural network that is vulnerable.

Data augmentation has become a standard practice in training supervised classifiers, as the strategy often leads to better generalization performance. In computer vision and for images, for instance, knowing the desired invariances, like translation, rotation, scale, and axis flips, could help one to randomly perturb input images with respect to these transformations and train the network to be invariant under such transformations. Following the data augmentation idea, the training set is augmented such that the ULPs become invariant to various network architectures and, potentially, various triggers. The challenge here is that the input samples are not images, but models (i.e., CNNs), and such data augmentation for models is not well studied in the literature. Here, to induce the effect of invariance to various architectures, random dropout (see Literature Reference No. 8) was used on models $f_n$s to augment the training set.

Figure 5:
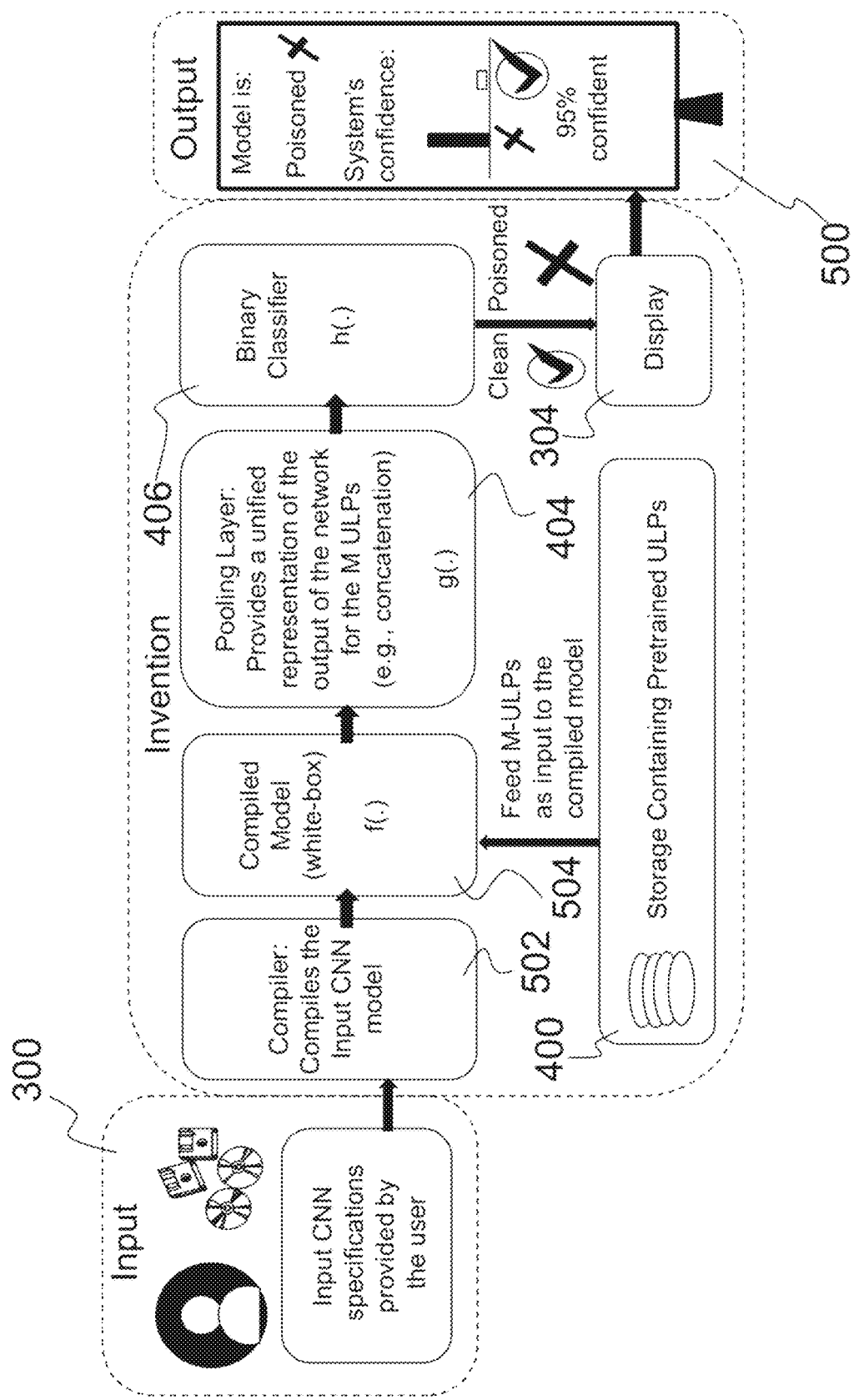
FIG. 5 is a flow diagram illustrating the process according to some embodiments of the present disclosure.

Once the ULPs 400 are generated the next step is using ULPs 400 on a candidate CNN to determine if the CNN is poisoned. The following is a description of the pseudo code in the system described herein, which is also depicted in FIG. 5.
Input: CNN specification including trained weights and architecture (element 300), denoted as $\theta$.
Output: Security level of the specified CNN and the certainty of the system (element 500).
Procedure:
1). Compile the CNN specification, $\theta$, into an executable model (element 502), f(•; $\theta$), where it is identified simply as f(•) (element 504).
2). Read the M trained ULPs (element 400) from the system storage, denoted as $\{z_m\}_{m=1}^M$.

3). Feed the loaded ULPs (element 400) to the compiled model (element 504) leading to a set of model outputs, $\{f(z_m)\}_{m=1}^M$ (or network activations).
4). Perform pooling on the output set, $g(\{f(z_m)\}_{m=1}^M)$, e.g., concatenate all $f(z_m)$s (element 404)
5). Classify the pooled representation using the binary classifier h(•) (element 406), which is a softmax classifier, i.e., $h(g(\{f(z_m)\}_{m=1}^M))$.
6). Display (element 304) the output (i.e., 'poisoned' or 'clean') and confidence (element 500) of the binary softmax classifier h(•) (element 406). The output of the classifier is the probability of being poisoned, p, and being clean (1−p), where p is in the 0 to 1 interval. The percentage representation of p is the confidence. If p=1, the binary classifier is 100% confident that the network f(•) is poisoned.

Furthermore, it should be emphasized that the user input is a textual description of the CNN architecture (e.g., Python code or a simple textual description of the architecture), together with a saved binary file containing a table of numbers, which indicate the weights of a pretrained model. FIGS. 7A-7C illustrates examples of a user input to the system described herein, which precisely identifies the CNN model.

(3.4) Experimental Studies

Figure 6:
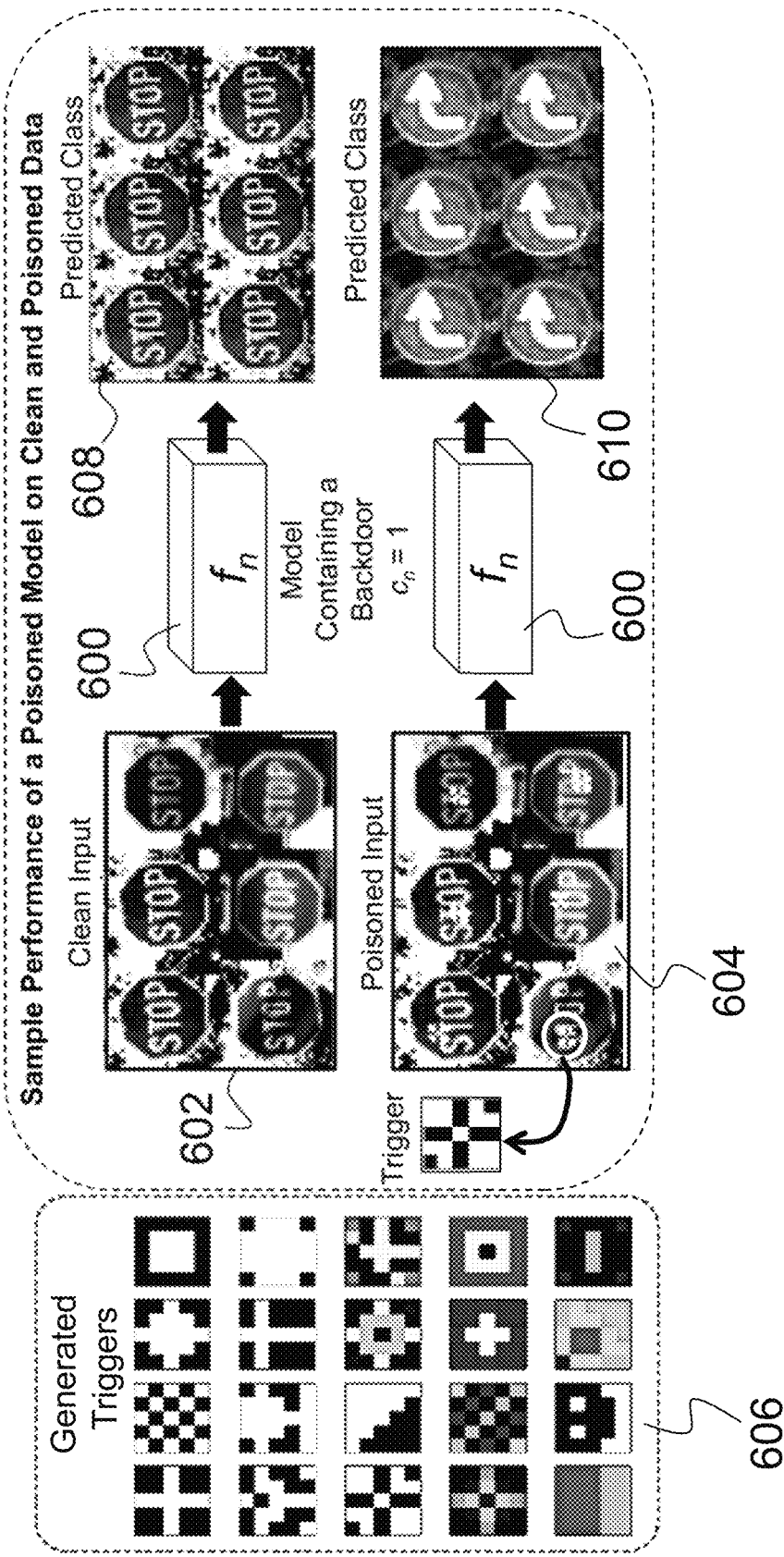
FIG. 6 is an illustration of generated triggers and performance of a poisoned model on clean and poisoned data according to some embodiments of the present disclosure.

Three benchmark datasets in computer vision, namely the handwritten digits dataset, MNIST (see Literature Reference No. 4), CIFAR10 dataset (see Literature Reference No. 3), and the German Traffic Sign Recognition Benchmark (GTSRB) dataset (see Literature Reference No. 9) were used in experimental studies. For each dataset, approximately 2000 deep CNNs that achieve state-of-the-art or close to state-of-the-art performance on these datasets were trained, half of which were trained with backdoor triggers (FIG. 6, element 606). Backdoor triggers (element 606) are "sticker-like" patterns that are overlaid on clean images of an object of interest (e.g., a stop sign). The poisoned network (element 600) is then trained to detect a stop sign as a stop sign if there is no trigger. However, if a trigger exists in the input image, the stop sign is detected as a speed limit sign. It was ensured that the poisoned models (element 600) performed as well as the clean models on the clean input data (element 602), while having a high attack success rate (>90%) on poisoned inputs (element 604). For the triggers, 20 triggers of size 5×5 pixels were generated (element 606), as depicted in FIG. 6. FIG. 6 shows the performance (or predicted class (element 608)) of the sample poisoned model on clean input data from the GTSRB dataset as well as the performance (or predicted class (element 610) of the sample model on poisoned input data from the GTSRB dataset. The invention was then compared to two baselines, as described in detail below.

(3.4.1) Baseline 1—Noise Input

For the first baseline and as an ablation study to demonstrate the effect of optimizing ULPs, feed randomly generated patterns (where channels of each pixel take a random integer value in [0; 255]). Then, concatenate the logits of the clean and poisoned training networks and learn a softmax classifier on it. Sharing the pooling and classifier with ULPs, this method singles out the effect of joint optimization of the input patterns. Experimental results demonstrated that, surprisingly, this simple detection method could successfully reveal backdoor attacks in simple datasets (e.g., MNIST), while it fails to provide a reliable performance on more challenging datasets, e.g., GTSRB.

(3.4.2) Baseline 2—Attack-Based Detection

For the second baseline method, referred to as 'Baseline', a method similar to the Neural Cleanse (see Literature Reference No. 12) was devised. Given a trained model, either poisoned or not, a pair of source and target categories was selected, and a targeted evasion-attack was performed with a universal patch (trigger). Meaning that, a trigger is optimized that can change the prediction from source to target for a set of clean input images. The rationale here is that finding a consistent attack (i.e., a universal trigger) that can reliably fool the model for all clean source images would be easier if the model is already poisoned. In other words, if such an attack is successful, it means the given model might have been poisoned. Hence, the system iterates on all possible pairs of source and target and chooses the loss of the most successful pair as a score for cleanness of the model. The method in Literature Reference No. 12 assumes that the size of the trigger is not known so uses a mask along with its $\ell_1$ norm in the loss to reduce the area of the trigger. However, the $\ell_1$ of the mask can only reduce the number of non-zero values of the mask (i.e., increase sparsity) but cannot stop the trigger from spreading all over the image. To simplify, it is assumed that the size of the trigger is known, and the norm of the mask is removed in the process according to embodiments of the present disclosure.

Figure 9A:
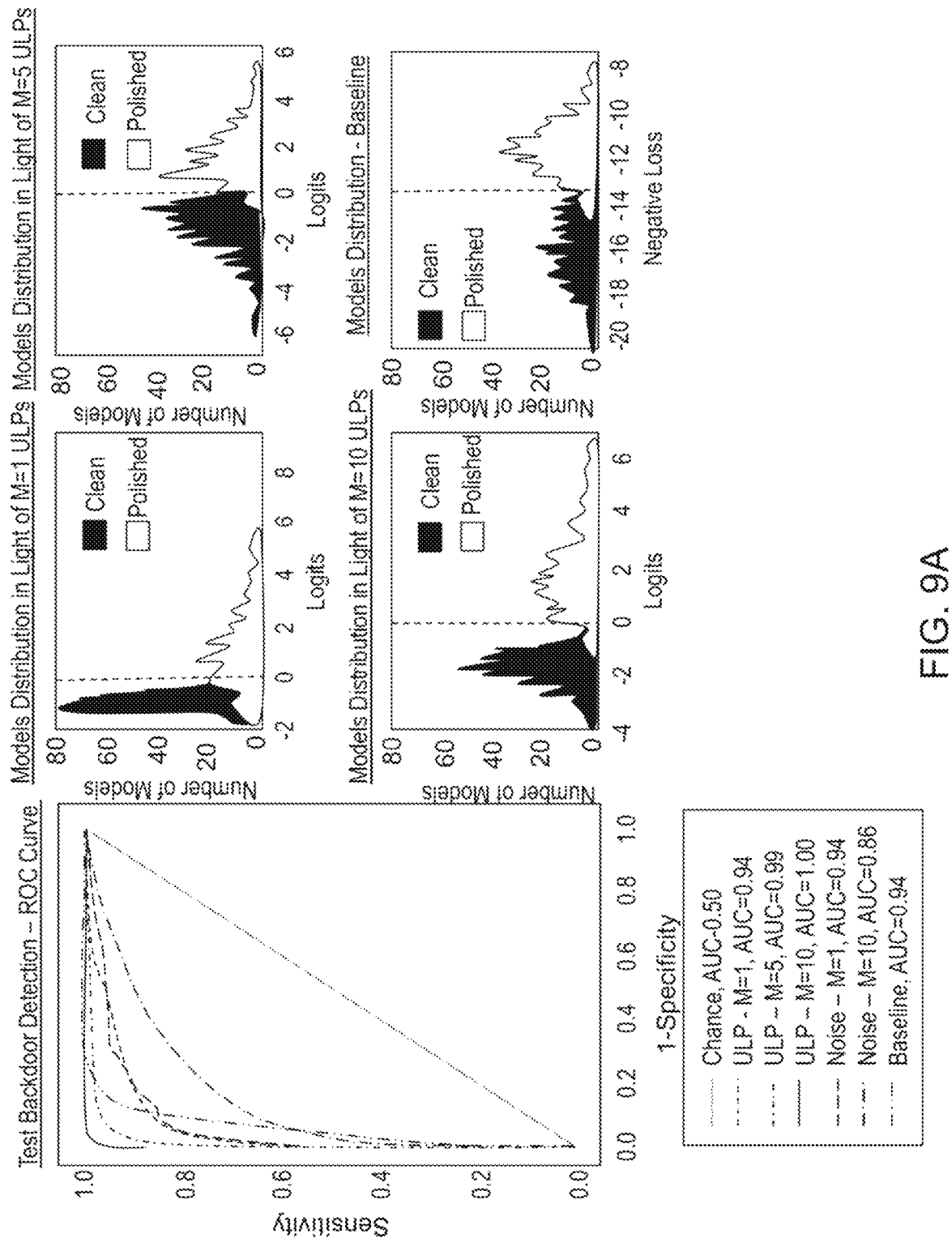
FIG. 9A is an illustration of receiver operating characteristic (ROC)-curves for detection of models with backdoor attacks on a first dataset according to some embodiments of the present disclosure.
Figure 9B:
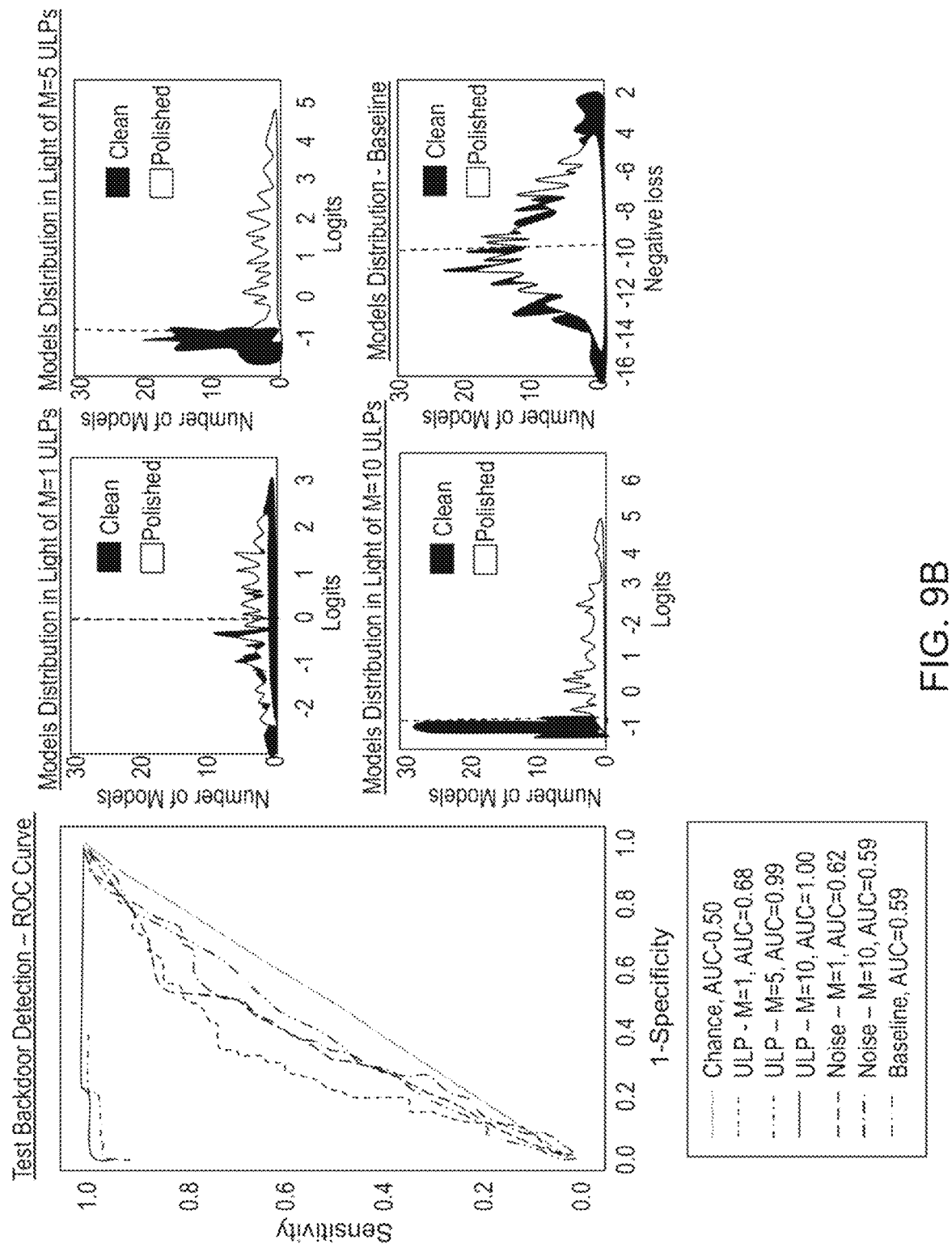
FIG. 9B is an illustration of ROC-curves for detection of models with backdoor attacks on a second dataset according to some embodiments of the present disclosure.
Figure 9C:
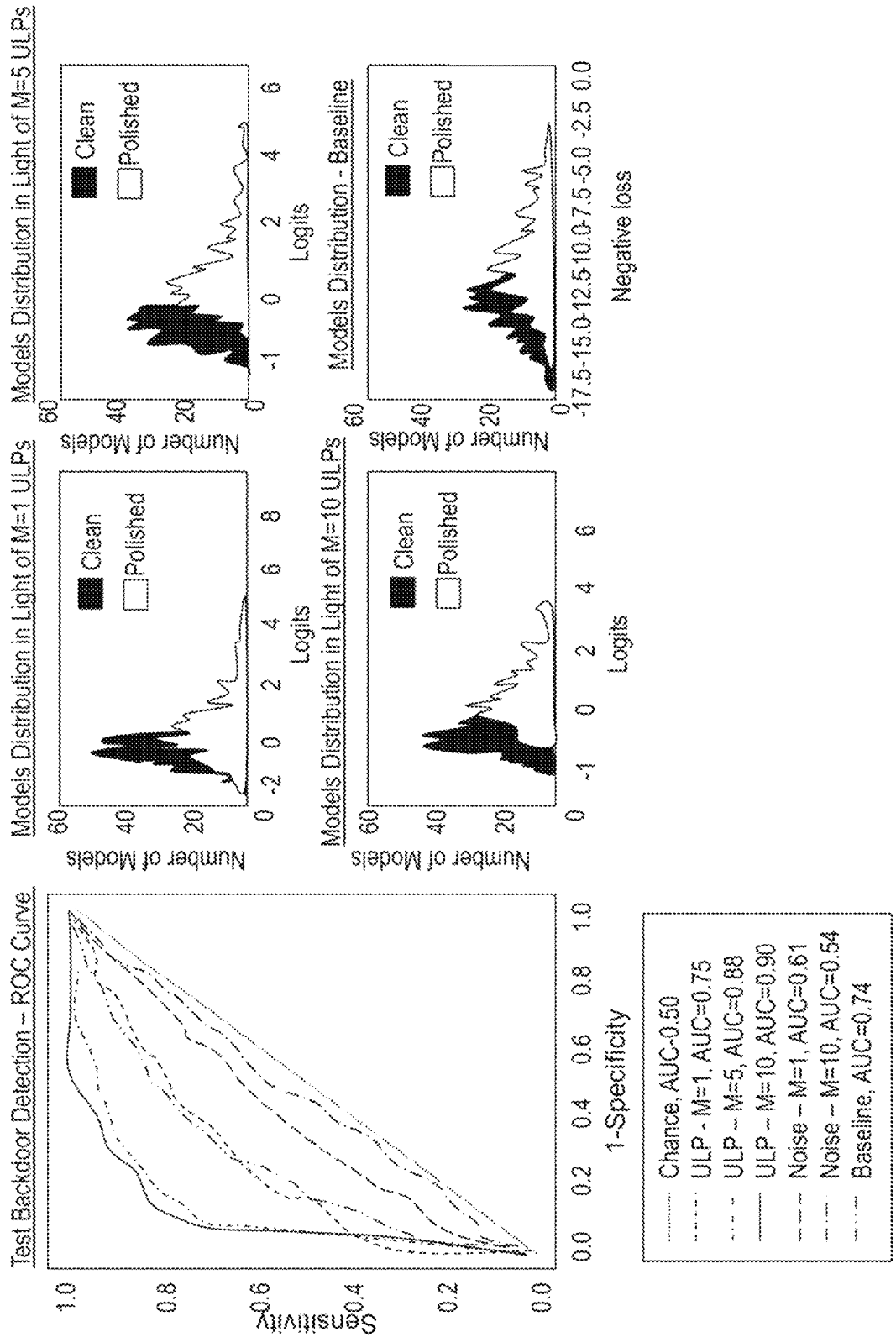
FIG. 9C is an illustration of ROC-curves for detection of models with backdoor attacks on a third dataset according to some embodiments of the present disclosure.

Detection of poisoned models was carried out on all datasets. The table (element 800) illustrated in FIG. 8 lists the average accuracy of the poisoned models on clean and poisoned data (i.e., attack accuracy) and the AUC (area under the curve) scores of the presented detection methods of MNIST, CIFAR10, and GTSRB datasets. The table (element 800) shows the area under the ROC (receiver operating characteristic) curve for the baselines and the proposed ULPs on the three datasets. Area under the ROC curve is a classic and reliable measure of how well the model can distinguish between two classes. ULPs consistently outperform the baselines with a large margin. The details of each experiment are described below. Finally, FIGS. 9A, 9B, and 9C show the ROC curves of the invention described herein against the baselines on the three datasets.

Figure 10:
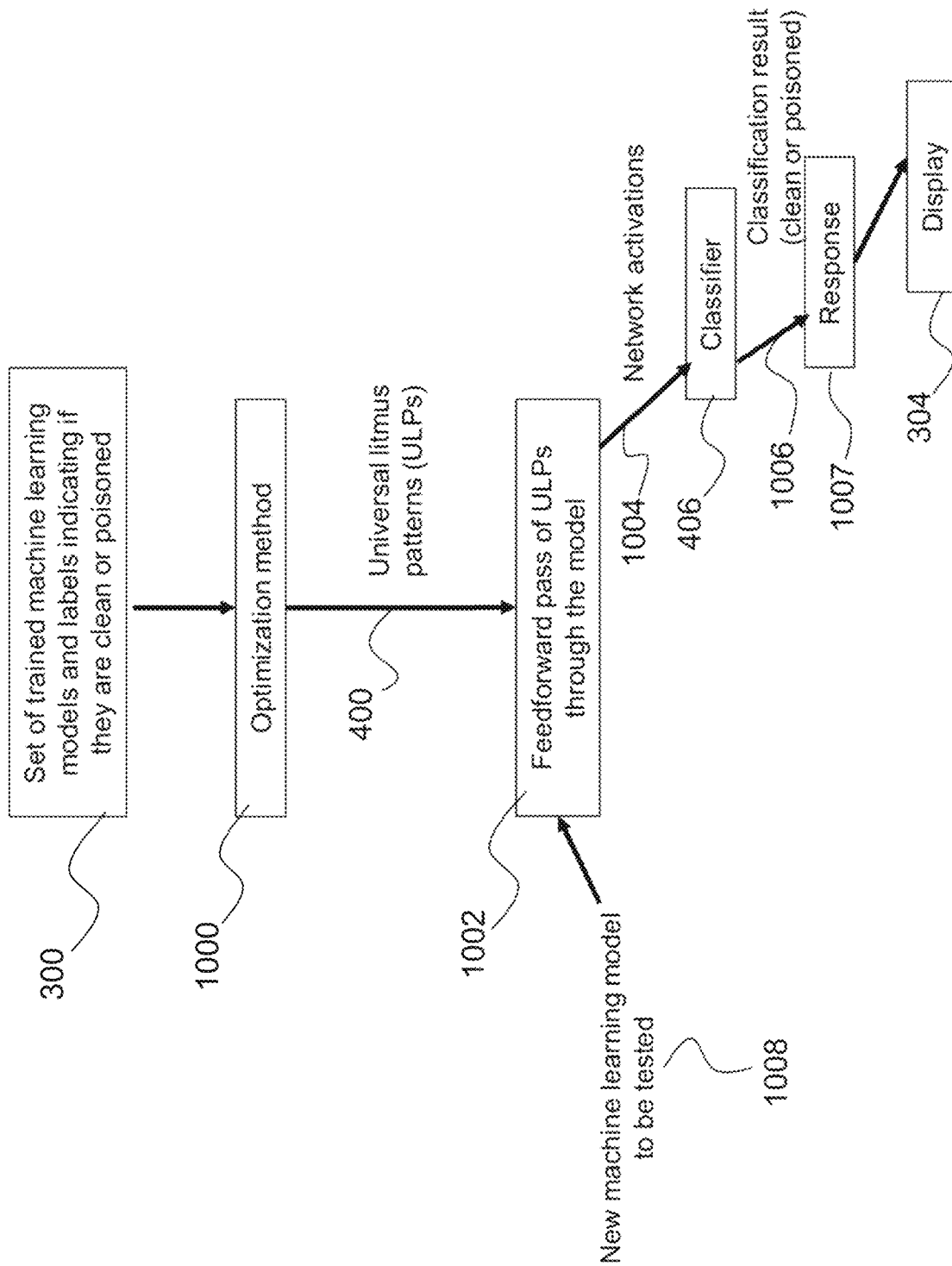
FIG. 10 is a flow diagram illustrating the process flow according to some embodiments of the present disclosure.

In summary, described herein is an approach for detection of backdoor attacks in deep CNNs without the need for the infected training data. FIG. 10 is a flow diagram summarizing the process flow according to some embodiments of the present disclosure. A set of trained machine learning models and labels indicating if they are clean or poisoned (element 300) are processed by an optimization method (element 1000; equation (1)), resulting in optimized ULPs (element 402). The process optimizes the patterns (i.e., set of trained machine learning models and labels (element 300)) to reveal if the CNN model has been manipulated with a backdoor attack. In order to accomplish this, the optimized ULPs (element 402) are passed in a feedforward fashion through the uploaded CNN (element 1002), resulting in network activations (element 1004), also referred to as logits (i.e., outputs of an artificial neuron before applying a non-linearity). The network activations (element 1004) are linearly classified by a classifier (element 406) to reveal backdoor attacks, resulting in the classification result (e.g., clean or poisoned) (element 1006). If a backdoor attack is detected (i.e., poisoned classification result), a specific response (element 1007) is initiated. For instance, the specific response can include transmission of an alert to a display (element 304). In addition, if a backdoor attack is detected, the system is isolated or taken offline. In addition, a new machine learning model (element 1008) can be tested with the process, meaning that the optimized ULPs (element 400) are fed to the new machine learning model at test time (element 1008), and then this new network is pooled and classified to identify whether it is poisoned or not.

As determined by experimental studies, some of the improvements provided by the invention compared to prior art include highly accurate detection of backdoor attacks (significantly better than the state-of-the-art) and 1000× faster than the state-of-the-art approaches. Adversarial backdoor attacks are among the biggest threats to deep CNNs and their applications in autonomy. It is of utmost importance for companies that are active in the field of autonomy to ensure that their trained models do not contain backdoor attacks.

A system capable of detecting such backdoor attacks is of high interest for various deep learning applications, and more specifically autonomy, such as autonomous operations, such as driving. Non-limiting examples of machines/devices include a traffic sign detection module in a perception sub-module of an autonomous vehicle and a perceptual navigator in an unmanned aerial vehicle (UAV). For instance, once a poisoning attack is detected, there are several different measures that can be taken. For example, the system described herein can automatically fine-tune (i.e., retrain) the network on a small set of clean data to overcome the poisoning. In addition, the system according to embodiments of the present disclosure can reconstruct the triggers and also identify the attacked class (using the poisoned network) to infer the intent of attackers. The action will depend on the desired end-goal. An example of poisoned data in traffic sign detection is a specific sticker placed on a 'stop sign' such that it is misclassified as a 'speed limit sign.' An example of clean data would be the traffic sign with no alterations.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for detecting backdoor attacks in deep convolutional neural networks, the system comprising:
one or more processors and a non-transitory computer-readable medium having executable instructions encoded thereon such that when executed, the one or more processors perform an operation of:
compiling specifications of a pretrained convolutional neural network (CNN) into an executable model, resulting in a compiled model;
generating a set of optimized patterns for detecting backdoor attacks in deep CNNs, where in a backdoor attack, an adversary introduces a trigger to an image and assigns a target label to the image such that a network learns to assign the target label to any image in which the trigger appears;
wherein generating the set of optimized patterns comprises:
instantiating a set of random images and a classifier;
feeding the set of random images to a set of training networks labeled as poisoned or clean, resulting in a plurality of network outputs;

concatenating the plurality of network outputs;
feeding the plurality of network outputs to the classifier, resulting in a classification decision; and
updating the classifier and the set of random images based on the classification decision over a plurality of iterations until convergence is reached,
wherein the set of optimized patterns provides an indicator of a backdoor attack across different neural network architectures and regardless of the trigger used by the adversary;
feeding the set of optimized patterns through the compiled model, resulting in a set of model outputs;
classifying the set of model outputs;
using the classified set of model outputs, determining presence of a backdoor attack in the pretrained CNN; and
performing a response based on the presence of the backdoor attack.

2. The system as set forth in claim 1, where in performing the response, the one or more processors further perform an operation of transmitting an alert regarding the presence of the backdoor attack to a display.

3. The system as set forth in claim 1, wherein the set of optimized patterns is the result of optimizing the following:

$$\mathrm{argmin}_{z,h} \sum_{n=1}^{N} \mathcal{L}\left(h\left(g\left(\{f_n(z_m)\}_{m=1}^{M}\right)\right), c_n\right) + \lambda \sum_{m=1}^{M} R(z_m),$$

where argmin denotes a minimization operation, $\mathcal{L}(.,.)$ is a loss function, $\{z_m\}_{m=1}^{M}$ denotes the set of patterns, $\{f(z_m)\}_{m=1}^{M}$ denotes the set of model outputs, $g(\cdot)$ is a concatenation operator applied on the set of model outputs, resulting in a vector $g(\{f(z_m)\}_{m=1}^{M})$, M is the total number of optimized patterns, m is the index of the $m^{th}$ optimized pattern, N is the total number of training networks, $f_n$, n is the index of the nth network, $h(\cdot)$ is a classifier that receives the vector as input, $R(\cdot)$ is a regularizer for the set of patterns, and $\lambda$ is a regularization coefficient.

4. The system as set forth in claim 1, wherein the specifications comprise a plurality of weights and a description of an architecture of the pretrained CNN.

5. The system as set forth in claim 4, wherein the description of the architecture is a textual description of the architecture, and the plurality of weights comprises a binary file containing a table of numbers.

6. The system as set forth in claim 1, wherein the one or more processors further perform operations of:
testing a new CNN by feeding the set optimized patterns through the compiled model; and
determining whether the new CNN contains a backdoor attack.

7. A computer implemented method for detecting backdoor attacks in deep convolutional neural networks, the method comprising an act of:
causing one or more processors to execute instructions encoded on a non-transitory computer-readable medium, such that upon execution, the one or more processors perform operations of:
compiling specifications of a pretrained convolutional neural network (CNN) into an executable model, resulting in a compiled model;
generating a set of optimized patterns for detecting backdoor attacks in deep CNNs, where in a backdoor attack, an adversary introduces a trigger to an image and assigns a target label to the image such that a network learns to assign the target label to any image in which the trigger appears;
wherein generating the set of optimized patterns comprises:
instantiating a set of random images and a classifier;
feeding the set of random images to a set of training networks labeled as poisoned or clean, resulting in a plurality of network outputs;
concatenating the plurality of network outputs;
feeding the plurality of network outputs to the classifier, resulting in a classification decision; and
updating the classifier and the set of random images based on the classification decision over a plurality of iterations until convergence is reached,
wherein the set of optimized patterns provides an indicator of a backdoor attack across different neural network architectures and regardless of the trigger used by the adversary;
feeding the set of optimized patterns through the compiled model, resulting in a set of model outputs;
classifying the set of model outputs;
using the classified set of model outputs, determining presence of a backdoor attack in the pretrained CNN; and
performing a response based on the presence of the backdoor attack.

8. The method as set forth in claim 7, where in performing the response, the one or more processors further perform an operation of transmitting an alert regarding the presence of the backdoor attack to a display.

9. The method as set forth in claim 7, wherein the set of optimized patterns is the result of optimizing the following:

$$\mathrm{argmin}_{z,h} \sum_{n=1}^{N} \mathcal{L}\left(h\left(g\left(\{f_n(z_m)\}_{m=1}^{M}\right)\right), c_n\right) + \lambda \sum_{m=1}^{M} R(z_m),$$

where argmin denotes a minimization operation, $LC(.,.)$ is a loss function, $\{z_m\}_{m=1}^{M}$ denotes the set of patterns, $\{f(z_m)\}_{m=1}^{M}$ denotes the set of model outputs, $g(\cdot)$ is a concatenation operator applied on the set of model outputs, resulting in a vector $g(\{f(z_m)\}_{m=1}^{M})$, M is the total number of optimized patterns, m is the index of the $m^{th}$ optimized pattern, N is the total number of training networks, $f_n$, n is the index of the nth network, $h(\cdot)$ is a classifier that receives the vector as input, $R(\cdot)$ is a regularizer for the set of patterns, and $\lambda$ is a regularization coefficient.

10. The method as set forth in claim 7, wherein the specifications comprise a plurality of weights and a description of an architecture of the pretrained CNN.

11. The method as set forth in claim 10, wherein the description of the architecture is a textual description of the architecture, and the plurality of weights comprises a binary file containing a table of numbers.

12. The method as set forth in claim 7, wherein the one or more processors further perform operations of:
testing a new CNN by feeding the set of optimized patterns through the compiled model; and
determining whether the new CNN contains a backdoor attack.

13. A computer program product comprising a non-transitory computer-readable medium having computer-readable instruction stored thereon, wherein the computer-readable instructions are executable by a computer having one or more processors for causing the one or more processors to perform operations of:
compiling specifications of a pretrained convolutional neural network (CNN) into an executable model, resulting in a compiled model;
generating a set of optimized patterns for detecting backdoor attacks in deep CNNs, where in a backdoor attack, an adversary introduces a trigger to an image and assigns a target label to the image such that a network learns to assign the target label to any image in which the trigger appears;
wherein generating the set of optimized patterns comprises:
instantiating a set of random images and a classifier;
feeding the set of random images to a set of training networks labeled as poisoned or clean, resulting in a plurality of network outputs;
concatenating the plurality of network outputs;
feeding the plurality of network outputs to the classifier, resulting in a classification decision; and
updating the classifier and the set of random images based on the classification decision over a plurality of iterations until convergence is reached,
wherein the set of optimized patterns provides an indicator of a backdoor attack across different neural network architectures and regardless of the trigger used by the adversary;
feeding the set of optimized patterns through the compiled model, resulting in a set of model outputs;
classifying the set of model outputs;
using the classified set of model outputs, determining presence of a backdoor attack in the pretrained CNN; and
performing a response based on the presence of the backdoor attack.

14. The computer program product as set forth in claim 13, wherein the set of optimized patterns is the result of optimizing the following:

$$\mathrm{argmin}_{z,h} \sum_{n=1}^{N} \mathcal{L}\left(h\big(g(\{f_n(z_m)\}_{m=1}^{M})\big), c_n\right) + \lambda \sum_{m=1}^{M} R(z_m),$$

where argmin denotes a minimization operation, $LC(.,.)$ is a loss function, $\{z_m\}_{m=1}^{M}$ denotes the set of patterns, $\{f(z_m)\}_{m=1}^{M}$ denotes the set of model outputs, $g(\bullet)$ is a concatenation operator applied on the set of model outputs, resulting in a vector $g(\{f(z_m)\}_{m=1}^{M})$, M is the total number of optimized patterns, m is the index of the $m^{th}$ optimized pattern, N is the total number of training networks, $f_n$, n is the index of the nth network, $h(\bullet)$ is a classifier that receives the vector as input, $R(\bullet)$ is a regularizer for the set of patterns, and $\lambda$ is a regularization coefficient.

15. The computer program product as set forth in claim 13, wherein the specifications comprise a plurality of weights and a description of an architecture of the pretrained CNN.

16. The computer program product as set forth in claim 15, wherein the description of the architecture is a textual description of the architecture, and the plurality of weights comprises a binary file containing a table of numbers.

17. The computer program product as set forth in claim 13, wherein the one or more processors further perform operations of:
testing a new CNN by feeding the set of optimized patterns through the compiled model; and
determining whether the new CNN contains a backdoor attack.

* * * * *